United States Patent [19]

Watts

[11] 3,957,707

[45] May 18, 1976

[54] ACRYLIC COMPOSITION AND FILM

[75] Inventor: William A. Watts, Akron, Ohio

[73] Assignee: The Goodyear Tire & Rubber Company, Akron, Ohio

[22] Filed: June 21, 1974

[21] Appl. No.: 481,611

[52] U.S. Cl................. 260/23 AR; 260/28.5 R;
260/45.7 R
[51] Int. Cl.² ............................. C08L 97/00
[58] Field of Search ................. 260/23 AR, 28.5; 206/45.34

[56] References Cited
UNITED STATES PATENTS

| | | | |
|---|---|---|---|
| 3,048,266 | 8/1962 | Hacknel | 206/45.34 |
| 3,479,308 | 11/1969 | Gattenby | 260/23 AR |

OTHER PUBLICATIONS

Skeist "Handbook of Adhesives," 1962, p. 230.

*Primary Examiner*—Donald E. Czaja
*Assistant Examiner*—William E. Parker
*Attorney, Agent, or Firm*—F. W. Brunner; J. D. Wolfe

[57] ABSTRACT

An acrylic composition useful for making films which are nonblocking and free of moisture-fogging tendencies made from acrylic polymers containing 40 to 80 parts of an alkyl acrylate or alkyl methacrylate having an alkyl group containing 2 to 10 carbon atoms and 20 to 60 parts vinyl nitrile by the use of several combinations of compounding agents, the combinations being sorbitan monofatty acid esters and polyoxyethylene monofatty acid esters.

4 Claims, No Drawings

ACRYLIC COMPOSITION AND FILM

This invention relates to an improved acrylate composition and to films thereof. More particularly, this invention relates to acrylate films having improved resistance to blocking and moisture fogging.

Many films and sheets of plastic tend to "block" when stacked or rolled upon themselves. This blocking or sticking of the sheets to themselves can either be a tolerable nuisance or an intolerable problem and the compounder is continually seeking to reduce or eliminate these blocking tendencies by incorporating waxes, soaps, silicones, inorganic powders, vegetable lecithins, fatty acid amides and many other ingredients.

However, in addition to desirable antiblock properties, many films and sheets of plastic require moisture anti-fog properties. This additional requirement is necessary if the film is used as a packaging material where the packaged component has moisture present and the package is subjected to temperature changes. Poor moisture antifog properties are an intolerable aesthetic problem. For example, in the packaging of fresh meat. Therefore, the compounder is compelled to resolve the moisture antifog problem while simultaneously retaining acceptable antiblock properties. Although the mono and the diglycerides, polyoxyethylene sorbitan and sorbitan fatty acid esters, polyoxyethylene sorbitan esters, polyoxyethylene acids, alcohols and adducts, anionic, ionic and nonionic, and many other surfactants are commonly used as moisture antifog agents, they are not satisfactory as antiblocking agents as special antiblocking agents are required, too.

I have discovered that several combinations of sorbitan and polyoxyethylene sorbitan fatty acid esters each reduce adhesion between layers of the acrylate film and to prevent moisture fogging of the film. More particularly, I have discovered that there are eight specific combinations of other antifogging agents with sorbitan monostearate that yields acrylate composition which yields films characterized by the properties of enhanced freedom from blocking and moisture fogging. These eight combinations of antifogging agents with sorbitan monostearate (SMS) are listed below as combinations No. 1 to 8, where the parts are expressed per 100 parts of acrylate resin:

| Combination No. | SMS | Other Agents | Amount |
|---|---|---|---|
| 1 | 0.5 – 10.0 | Sorbitan monolaurate | 0.5 – 10.0 |
| 2 | 0.5 – 10.0 | Sorbitan monolaurate | 0.5 – 10.0 |
|   |   | Polyoxyethylene sorbitan monolaurate | 0.5 – 10.0 |
| 3 | 0.5 – 10.0 | Sorbitan monolaurate | 0.5 – 10.0 |
|   |   | Polyoxyethylene sorbitan monopalmitate | 0.5 – 10.0 |
| 4 | 0.5 – 10.0 | Sorbitan monolaurate | 0.5 – 10.0 |
|   |   | Polyoxyethylene sorbitan monooleate | 0.5 – 10.0 |
| 5 | 0.5 – 10.0 | Sorbitan monopalmitate | 0.5 – 10.0 |
| 6 | 0.5 – 10.0 | Sorbitan monopalmitate | 0.5 – 10.0 |
|   |   | Polyxoyethylene sorbitan monolaurate | 0.5 – 10.0 |
| 7 | 0.5 – 10.0 | Sorbitan monopalmitate | 0.5 – 10.0 |
|   |   | Polyoxyethylene sorbitan monopalmitate | 0.5 – 10.0 |
| 8 | 0.5 – 10.0 | Sorbitan monopalmitate | 0.5 – 10.0 |
|   |   | Polyoxyethylene sorbitan monooleate | 0.5 – 10.0 |

Use of these combinations of treating agents in acrylic composition produces films of unusual characteristics.

The acrylate polymers useful in this invention can be prepared by the emulsion polymerization technique in which, for example, 186 parts by weight deionized water, 7.4 parts by weight (28% active surfactant) sodium tetradecyl sulfate, and oil part by weight of potassium persulfate were charged into an evacuated reactor. Then the charged reactor was flushed twice with nitrogen. Forty parts by weight acrylonitrile, 60 parts by weight 2-ethylhexyl acrylate, 0.0 to 1.0 part by weight (55% active) divinyl benzene, and 0 to 1.0 part by weight of mixed tertiary mercaptans were then charged into the reactor. The batch was heated to 60°C. and the stirrer was set at 250 revolutions per minute using a turbine agitator with baffles. Twenty-five pounds per square inch of nitrogen pressure was maintained in the reactor. The reaction was conducted until 34.5 percent solids content was obtained. The batch was then cooled to room temperature and the following emulsified dispersions were added: 0.1 part by weight of a sterically hindered phenolic antioxidant, 0.1 part by weight of dilaurylthiodipropionate, 0.5 part by weight thermoplastic phosphite copolymer of pentaerythritol and hydrogenated bisphenol A having a molecular weight of 2000 to 2300, melting point 50°C. and phosphorous content of 11 to 13 percent, and 1.0 part by weight of 2-hydroxy-4-n-octoxy benzophenone in water. The latex was coagulated in a hot aqueous, 3.0 weight percent magnesium sulfate solution and washed thoroughly with deionized water. The coagulated crumb was dried in an oven at 50°C.

If after the monomers are added to the reactor, and maintained under 25 p.s.i. nitrogen in the reactor, the batch fails to initiate within one hour, the following solution is added: 0.03 part by weight sodium bisulfite dissolved in 1.0 part by weight deionized water. If the total run fails to reach 34.5 weight percent solids, the following is added: 0.03 part by weight sodium bisulfite in 1.0 part by weight deionized water, and 0.03 part by weight potassium persulfate in 1.0 part by weight deionized water.

The compounding variables with the above acrylic resins was the amount of the various combination agents used. The films were prepared by first dispersing and dissolving all the ingredients in tetrahydrofuran at 120°F. to 130°F. using a relatively low speed, laboratory air stirrer and then casting the solution on glass plates. The resultant cast polymer solution was partially dried in a plate oven at 50°C. The partially dried films were then completely dried in a dynamic air oven at 77°C. for 40 minutes. All films were made at a thickness of one mil.

Various combinations of antifogging agents were evaluated at various levels in the base formulation. These combinations of agents produce an antiblocking and antifog effect of synergistic proportions. This result was obtained without loss of the appearance or physical properties of the original "untreated" film.

Each formulation in Table 1 was mixed at 50°–56°C. in a 16-ounce bottle. After complete mixing of all ingredients, films were cast on 8 inch × 11 inch glass plates. The resultant cast films were stripped and stored at room temperature prior to antifog and antiblock tests. All parts and percentages are by weight unless otherwise indicated. Films were prepared from each formulation of Table 1 according to the aforementioned procedure. Comparisons of the formulations were made based on two antiblocking tests and one moisture antifog test run as follows: (1) Block Test No. 1 - Two film samples are placed together so that a 5 inch × 5 inch two-ply specimen is obtained. This specimen is placed between two metal plates and a 0.5 pounds per square inch pressure was exerted evenly over the entire area. The whole assembly is placed in a dynamic air oven at 50°C. for 24 hours and then tested for blocking (sticking or adhesion) by pulling apart. The test results are reported in Table 1. (2) Block Test No. 2 involves two film samples placed together so that a 2 inch × 2 inch two-ply specimen is obtained. This specimen is placed between two metal plates and a 200 gram weight is placed over the top plate. The whole assembly is placed in a dynamic air oven at 50°C. for 24 hours. At the end of this period, the film is tested (sticking blocking (stocking or adhesion) resistance, as shown below, by measuring the force in grams required to separate the films. (3) Testing for antifog characteristics is accomplished by taut extension of the film over a beaker of hot water (60°C.). All films were tested with one inch of air space between the film and the water. An effective antifogging agent will disperse visible condensed water vapor on the film in a relatively short time, less than one minute is acceptable commercially. The time in minutes required for complete disappearance of the water cloud is reported as antifogging time.

Representative alkyl acrylates and alkyl methacrylates having from 1 to 10 carbon atoms in the alkyl radical useful for making acrylate polymers are ethyl acrylate, n-propyl acrylate, n-butyl acrylate, isobutyl acrylate, n-octyl acrylate, 2-ethylhexylacrylate, methyl methacrylate, butyl methacrylate, n-hexyl methacrylate, tetradecyl methacrylate, n-decyl methacrylate and 2-ethylhexyl methacrylate.

For example, the mixture advantageously contains from 30 percent to 90 percent by weight of one or more alkyl acrylates or mixtures of acrylates and methacrylates and from 10 to 70 percent by weight of one or more of the vinyl nitrile monomers. It is preferred that the mixture contain from 40 to 80 percent of alkyl acrylate and 20 to 60 percent of a vinyl nitrile monomer such as acrylonitrile, methacrylonitrile and ethacrylonitrile.

The polymerization of the above monomeric mixtures may be effected by a number of known methods. For example, polymerization of the alkykl acrylate or an admixture thereof with a minor proportion of alkyl methacrylate may be effected by a number of known methods. For example, polymerization of the alkyl acrylate or an admixture thereof with a minor proportion of alkyl methacrylate may be effected in solution or in a homogeneous system by the application of heat or actinic light, with or without the presence of peroxygen compounds known to initiate polymerization. It is preferred, however, to carry out polymerization of the Table 1

| Formulation Recipe | No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Sorbitan monolaurate | | 6 | | | | | | 4 | 4 | 4 | 4 | | | | |
| Sorbitan monopalmitate | | | 6 | | | | | | | | | 4 | 4 | 4 | 4 |
| Sorbitan monostearate | | | | 6 | | | | 2 | 2 | 2 | 2 | 2 | 2 | 2 | 2 |
| Polyoxyethylene sorbitan monolaurate | | | | | 6 | | | | 2 | | | | 2 | | |
| Polyoxyethylene sorbitan monopalmitate | | | | | | 6 | | | | 2 | | | | 2 | |
| Polyoxyethylene sorbitan monooleate | | | | | | | 6 | | | | 2 | | | | 2 |
| Acrylate polymer | | 100 | 100 | 100 | 100 | 100 | 100 | 100 | 100 | 100 | 100 | 100 | 100 | 100 | 100 |
| Test on Film made from above recipes: | | | | | | | | | | | | | | | |
| Block Test No. 1 | | B | B | NB | B | B | B | NB | NB | NB | NB | NB | NB | NB | NB |
| Block Test No. 2 | | T | T | 200 | T | T | T | 30 | 40 | 45 | 40 | 5 | 10 | 15 | 13 |
| Antifog test, minutes to clear | | 5 | 10 | 20 | NC | NC | NC | 0.5 | 0.3 | 0.2 | 0.3 | 0.3 | 0.2 | 0.2 | 0.2 |

The symbols:
B designates blocking;
NB designates nonblocking;
NC designates nonclearing; and
T shows the film tore because the blocking was so severe in Test No. 2.

The film test data of Table 1 demonstrates the unexpected and unobvious results obtained wherein the use of a single antifogging agent which yields films having undesirable moisture fogging and blocking characteristics in certain combinations yield films having desirable characteristics. Especially is the improvement in moisture fog resistance and resistance to blocking noted where three antifogging agents are used together. The preferred range of usage is 6 to 8 parts of the fatty acid esters listed in the combinations 1 to 8.

The acrylate films that may be advantageously compounded with the combination of antiblocking and antifogging agents of this invention are those polymers made from mixtures containing one or more monomers from each of the two essential classes disclosed. While the proportions of each of the two essential monomers in the monomeric mixture may vary somewhat, such variation must be within certain definite limits, listed above in order to produce clear, rubbery, interpolymers having the improved properties which are the objects of this invention, yet retaining the desirable properties possessed by the polymeric alkyl acrylate.

monomeric mixture in an aqueous emulsion in the presence of a polymerization initiator and, if desired, a polymerization modifier. The ratio of alkyl acrylate to alkyl methacrylate may vary from 95/5 to 40/60, a major proportion of the acrylate being preferred.

Polymerization initiators include benzoyl peroxide, hydrogen peroxide, cumene, hydroperoxide, and other peroxygen compounds, as well as other types of polymerization initiators such as diazoamino benzene. Those soluble in hydrocarbons are, of course, preferred in the solution or homogeneous methods in accordance with the invention. Other substances which speed up the reaction such as reducing agent in combination with one of the peroxygen compounds may be utilized. Polymerization modifiers such as the sulfur-containing modifiers, including aliphatic mercaptans usually employed in the polymerization of butadiene hydrocarbons, to form rubbery polymers, have much the same effect on the polymerization of the alkyl acrylates and may be advantageously employed when a very soft polymer is desired.

If the polymerization is conducted in emulsion, a water soluble catalyst is employed. Such catalysts include potassium persulfate, ammonium persulfate and other recognized water soluble catalysts. Also, if emulsion polymerization is used, the amount of the modifier such as an aliphatic mercaptan may be increased to 0.5 to 1.0 part per 100 parts by weight of polymer.

In the polymerization of the monomeric mixtures of this invention, temperature is not critical; permissible reaction temperatures vary from as high as 100°C. or even higher down to 0°C. or even as low as −10°C. or −20°C. The preferred temperature range is 20°C. to 80°C. In solution polymerization with temperatures of 20°C. to 80°C., it is possible to obtain quantitative yields of copolymer in from about 1 to about 15 hours.

While certain representative embodiments and details have been shown for the purpose of illustrating the invention, it will be apparent to those skilled in the art that various changes and modifications may be made therein without departing from the spirit or scope of the invention.

What is claimed is:

1. A film made from the polymer resulting from the reaction of from 40 to 80 parts of an acrylate selected from at least one of the group consisting of alkyl acrylate and alkyl methacrylate wherein the alkyl group contains from 2 to 10 carbon atoms, and from 20 to 60 parts of a vinyl nitrile wherein the film contains a combination of antiblocking and antifogging agents selected from the combinations of (1) sorbitan monolaurate and sorbitan monostearate, (2) sorbitan monolaurate, sorbitan monostearate and polyoxyethylene sorbitan monolaurate, (3) sorbitan monolaurate, sorbitan monostearate and polyoxyethylene sorbitan monopalmitate, (4) sorbitan monolaurate, sorbitan monostearate and polyoxyethylene sorbitan monooleate, (5) sorbitan monopalmitate and sorbitan monostearate, (6) sorbitan monopalmitate, sorbitan monostearate and polyoxyethylene sorbitan monolaurate, (7) sorbitan monopalmitate, sorbitan monostearate and polyoxyethylene sorbitan monopalmitate, and (8) sorbitan monopalmitate, sorbitan monostearate and polyoxyethylene sorbitan monooleate.

2. The film of claim 1 wherein the acrylate is 2-ethylhexyl acrylate and the vinyl nitrile is acrylonitrile.

3. The film of claim 2 wherein the monomers are present in amounts of 60 and 40 parts by weight respectively.

4. The film of claim 2 wherein each antiblocking/antifogging agent is present in an amount from about 0.5 to 10.0 parts per hundred parts of resin.

* * * * *